United States Patent Office 2,973,382
Patented Feb. 28, 1961

2,973,382

SALTS OF ACID DIESTERS OF POLYGLYCOLS WITH ORGANIC BASES, AND PROCESS OF MAKING AND USING SAME

Emil Dreher, Stockach, Baden, Germany, assignor to Byk-Gulden Lomberg Chemische Fabrik G.m.b.H., Konstanz (Bodensee), Germany, a corporation of Germany No Drawing. Filed July 24, 1958, Ser. No. 750,597

Claims priority, application Germany July 26, 1957

7 Claims. (Cl. 260—404)

The present invention relates to new and valuable salts of acid diesters of polyglycols, and more particularly to salts of acid diesters of polyglycols with organic bases, which salts are excellent suspending agents for pigment containing paints and other film-forming suspensions, to a process of producing such salts, and to a method of using the same.

Pigment containing paints and synthetic resin solutions, emulsions, and dispersions are widely used in the art. Such compositions very often show the disadvantage that the pigments contained therein precipitate on storage which renders the use of such products rather difficult. A considerable number of different chemical compounds has been proposed to serve as suspending agents for preventing precipitation and settling of the pigments. However, these suspending agents, in general, have a disadvantageous effect on the properties of the resulting lacquer film or coating.

For instance, water soluble metal sulfonates and other anionic or cationic surface active compounds commonly used in this field detrimentally affect the weather and water resistance of such films or coatings. Other suspending agents used heretofore, such as inorganic gels, lower the stability of such films to light, their adherence to surfaces, and their mechanical strength properties. The above mentioned suspending agents are more or less foreign to and incompatible with the paints, lacquers, and synthetic resin preparations. Therefore, it is understandable that they produce unfavorable and undesired effects on the lacquer films or coatings.

It is one object of the present invention to provide new and valuable salts of acid diesters of polyglycols with organic bases which salts are useful suspending agents for lacquer, varnish, and the like pigment containing suspensions.

Another object of the present invention is to provide new and valuable suspending agents for pigment containing paints, lacquers, and other film forming suspensions.

A further object of the present invention is to provide a simple and effective process of producing such new and valuable salts.

Still another object of the present invention is to provide a simple and effective method of using the new salts as suspending agents in pigment containing paints, lacquers, and other film forming synthetic resin preparations.

Other objects of the present invention and advantageous features thereof will become apparent as the description proceeds.

In principle, the present invention relates to new salts which are excellent suspending agents for pigment containing paints, lacquers, and other film-forming compositions and which correspond to the following formula

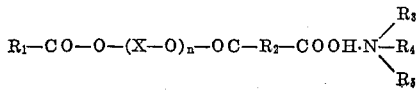

wherein

X is an alkylene radical with 2 or 3 carbon atoms;
$R_1$ represents an alkyl radical having 11 to 23 carbon atoms which alkyl radical may contain one or more double bonds and may be substituted by a hydroxyl group, such as the radicals of saturated or unsaturated higher fatty acids;
$R_2$ represents a saturated or unsaturated alkylene radical having 2 to 3 carbon atoms which may be substituted by a hydroxyl group and/or a carboxyl group, or a phenylene radical;
$R_3$ and $R_4$ represent hydrogen, a lower alkyl radical, especially a methyl radical, a lower alkyl radical substituted by a hydroxyl group, especially a $\beta$-hydroxy ethyl group, or a cyclohexyl radical; and
$R_5$ represents a lower alkyl radical substituted by a hydroxyl group, especially a $\beta$-hydroxy ethyl group or a cyclohexyl radical, while
$n$ is an integer from 4 to 25.

Not only polyethylene glycols but also other straight chain or branched polyalkylene glycols, for instance, polypropylene-1,3-glycols or polypropylene-1,2-glycols, may be used likewise. However, polyethylene glycols having a molecular weight between about 200 and about 1000 are the preferred compounds. One of the two hydroxyl groups of the polyalkylene glycol compound is esterified with a fatty acid which may be saturated or may contain one or more double bonds. Such fatty acids may also be substituted by a hydroxyl group. Not only the pure fatty acids but also mixtures thereof as they are obtained from natural fats and oils, for instance, tall oil, castor oil, linseed oil, or the like can be used for esterification. Synthetic fatty acids and mixtures thereof may also be employed for the preparation of the salts according to the present invention.

The other hydroxyl group of the polyalkylene glycol is mono-esterified with a saturated or unsaturated di- or polycarboxylic acid or their substitution products, such as hydroxy- or amino-substituted di- or polycarboxylic acids.

The free carboxyl group, or groups, of the resulting diester compound is converted into the new salts by neutralization by means of a, preferably slightly water-soluble, organic base, such as dimethyl cyclohexyl amine, dicyclohexyl amine, and the like. Water soluble bases may also be used provided the resulting salts are slightly water-soluble. Such slightly water-soluble salts are formed, for instance, with the water-soluble triethanol amine.

The salts according to the present invention are prepared by heating a mixture of the polyalkylene glycol compound and the fatty acid, for instance, fatty acid mixtures obtained from tall oil, castor oil, linseed oil or the like, to a temperature of about 205° C. in the presence of a dehydrating agent, such as boric acid anhydride, while passing nitrogen through the reaction mixture. After the calculated amount of water has distilled off, the resulting mono-ester compound is cooled to about 140° C. The di- or polycarboxylic acid compound is then added and the mixture is again heated to about 220° C. in the presence of boric acid anhydride, while passing nitrogen therethrough. As soon as mono-esterification of the di- or polycarboxylic acid is completed, the mixture is filtered and cooled. The resulting oily diester is mixed with the stoichiometric amount of the desired base, preferably in the presence of an organic solvent such as xylene.

The resulting salt which represents the suspending agent according to the present invention, is slightly water-soluble, but readily soluble in almost all organic solvents, even in non-polar solvents. Therefore, it can be mixed with paints, lacquers, and other plastic film-forming compositions without rendering the lacquer film or coating sensitive to water. The new salts do not impair the other properties of the films and coatings.

The particular advantage of the new salts according to the present invention consists in the possibility of varying their properties in accordance with the desired purpose by optionally varying the fatty acid moiety and/or the di- or polycarboxylic acid moiety of the ester.

For instance, if unsaturated dicarboxylic acids, such as maleic acid, are used, the resulting salts are capable of additive polymerization. On the other hand, if the polyalkylene glycol is esterified with a fatty acid containing several double bonds, such as linseed oil or tall oil fatty acids, oxygen-linked polymerization is possible. By combining these two possibilities, products are obtained which prevent settling of the pigments in pigment containing paints, lacquers, and the like film-forming solutions, emulsions or dispersions and which, after evaporation of the solvent or after demulsification of emulsions, participate in the film formation and act at the same time as binding agents in the solid phase. Such an effect could not be achieved by using the heretofore known suspending agents.

In addition to this valuable property, the salts according to the present invention have other advantageous properties which are of value in the lacquer and the like art. For instance, they impart to the resulting film a high luster, excellent adhesiveness, and a smooth surface. They furthermore do not thicken the paints, lacquers, or synthetic resin compositions during storage; they do not attack metallic surfaces to which they are applied; and they readily form stable dispersions even with heavy pigments, such as barite.

The following examples serve to illustrate the present invention without, however, limiting the same thereto. More particularly, the fatty acid, the di- or polycarboxylic acid, the polyalkylene glycol, and the organic base used as reactants, the reaction conditions, such as duration and temperature, and the solvents and dehydrating agents employed may be varied by those skilled in the art in accordance with the principles set forth herein and in the claims annexed thereto.

*Example 1*

A mixture of 200 g. of polyethylene glycol of an average molecular weight of 200, and 290 g. of tall oil fatty acids is gradually heated to 205° C. in the presence of 0.5 g. of boric acid anhydride, while passing nitrogen through the reaction mixture. The mixture is kept at said temperature until the stoichiometric amount of water is distilled off. The resulting mono-ester compound is cooled to 140° C. and 98 g. of maleic acid anhydride are added thereto. The mixture is again gradually heated to and kept for one hour at 200° C. After filtering, the reaction product is allowed to cool whereby the oily diester is obtained as a dark viscous oil.

The crude oily diester is converted into its salt by mixing with the calculated amount of dimethyl cyclohexylamine, i.e., 127 g. Thereby, the dimethyl cyclohexylamine salt is obtained in the form of an oil.

The crude salt is readily dissolved in 698 g. of xylene to yield a 50% solution which can directly be used as suspending agent. The solution is clear and stable, even at low temperatures. It can be diluted in any desired proportions with xylene or other conventional lacquer solvents and is compatible with almost any kind of lacquer, paint, enamel, or other plastic solution.

*Example 2*

Equimolecular amounts of polyethylene glycol with an average molecular weight of 200, castor oil fatty acids, and maleic acid are esterified in the same manner as described in Example 1. The resulting diester is an oil.

The crude ester is diluted with xylene and then neutralized with an equimolecular amount of dimethyl cyclohexylamine by following the procedure described in Example 1. Thereby a clear and stable 50% solution of the new salt is obtained which can directly be used as suspending agent.

The salt is recovered from said xylene solution by distilling off the solvent in a high vacuum. It is obtained in the form of a yellow oil.

The xylene solution of the crude salt can directly be added to paints, lacquers, and the like compositions to prevent sedimentation of pigments even on prolonged storage.

*Example 3*

1000 g. of a polyethylene glycol having an average molecular weight of 1000, 280 g. of linseed fatty acids, and 132 g. of a mixture of phthalic acid and maleic acid in the proportion 1.3:1, the amount of said mixture corresponding to 1 mole of said fatty acid ester, are esterified in the same manner as described in Example 1. The resulting diester is an oil.

The crude ester is neutralized by the addition of the required amount of cyclohexylamine (about 100 g.).

The resulting salt forms a pale yellow mobile oil. It is diluted with an amount of dipentene sufficient to yield a 60% solution. Said solution can directly be added to paints, lacquers, and the like compositions as suspending agent according to the present invention.

*Example 4*

1000 g. of a polyethylene glycol of an average molecular weight of about 1000, 300 g. of castor oil fatty acids, and 192 g. of citric acid are esterified as described in Example 1. The resulting ester is a viscous oil.

The crude ester is neutralized by the addition of triethanolamine (about 149 g.). The resulting salt is obtained in the form of a yellow oil. It is added as such or, after dilution with hydrocarbon thinners, such as petroleum solvent naphtha with 90–95% of aromatic components and the like, to paint, lacquer and the like compositions and serves as suspending agent preventing sedimentation of the pigments in such compositions.

In place of castor oil fatty acids, linseed oil fatty acids, tall oil fatty acids used in the preceding examples, there can be employed other fatty acids having 12 to 24 carbon atoms, such as lauric acid, palmitic acid, stearic acid, arachic acid, lignoceric acid, oleic acid, erucic acid, linoleic acid, linolenic acid, eleostearic acid, ricinoleic acid, and other natural or synthetic saturated or unsaturated, hydroxy-substituted or unsubstituted fatty acids, or mixtures thereof, or the mixtures obtained by saponification of natural oils or fats, such as rapeseed oil, cotton seed oil, tung oil, peanut oil, sunflower oil, oiticica oils, fish oils, soybean oil.

In place of maleic acid, phthalic acid, and citric acid used in the preceding examples as polycarboxylic acid reactant, there may be employed equimolecular amounts of other di- and polycarboxylic acids which may be substituted by a hydroxyl group or a carboxyl group, such as tartaric acid, glutaric acid, fumaric acid, succinic acid, pyrotartaric acid, itaconic acid, malic acid, aspartic acid, glutamic acid, isophthalic acid, terephthalic acid, and others.

Esterification with such fatty acids and such polycarboxylic acids proceeds in the same manner as described in the preceding examples.

The organic bases dimethyl cyclohexylamine, cyclohexylamine, and triethanolamine used for salt formation in the preceding examples can be replaced by equimolecular amounts of other amino compounds, capable of forming slightly water-soluble salts with said acid diesters, such as methyl-dicyclohexylamine, dicyclohexylamine, other lower dialkyl cyclohexylamines, for instance, diethyl cyclohexylamine, methyl-ethyl-cyclohexylamine. Otherwise, the procedure is substantially the same as described in the preceding examples.

The new salts according to the present invention are added either as such or in solution in suitable lacquer solvents and preferably in xylene and dipentene to lacquer, paint, and the like compositions in order to prevent or at least considerably retard sedimentation of the pigments present in such compositions. The salts are added to such compositions in amounts between about 0.1% and about 1.0% and preferably in an amount between about 0.2% and 0.3% calculated for the content of pigments and other fillers in such compositions.

The following examples serve to illustrate the use of the new salts as suspending agents according to the present invention without, however, limiting the same thereto.

*Example 5*

350 kg. of a 70% solution of an alkyd resin sold under the trademark "Alkydal L Extra," in white spirit,
200 kg. of chrome yellow,
200 kg. of barite,
100 kg. of zinc oxide,
170 kg. of white spirit,
50 kg. of a solvent mixture sold under the trademark "Byketol,"
8 kg. of butanol,
10 kg. of a 50% solution of xylenol in dipentene, and
8 kg. of a cobalt-manganese siccative 1:2 dissolved in xylene sold under the trademark "Soligen"

are intimately mixed. The alkyd resin sold under the trademark "Alkydal L Extra" is a phthalic acid resin of the firm Farbenfabriken Bayer, Leverkusen, Germany. The solvent sold under the trademark "Byketol" is a mixture of unsaturated cyclic hydrocarbons and of esters of lower hydroxy carboxylic acids. It has a boiling range between 170° C. and 190° C. and is sold by the firm Byk-Gulden Lomberg Chemische Fabrik G.m.b.H. of Konstanz (Bodensee), Germany. 3.8 kg. of a 50% xylene solution of the neutral salt prepared according to Example 1 are admixed to the resulting base lacquer in order to prevent sedimentation of the pigments.

Without the addition of the suspending agent according to the present invention, the pigments of the above given mixture settle after a short period of time and form a solid hard cake which can be redispersed by stirring with difficulty only. In contrast thereto, the lacquer according to this example does not form a sediment even after 4 weeks. The addition of the new suspending agent does not in the least impair the advantageous properties of the lacquer without such an addition.

*Example 6*

470 kg. of a fatty acid modified varnish of the copal-ethoxyline-alkyd resin type containing 50% of the binding resin, xylene as solvent, and 0.8% of a cobalt-manganese siccative, dissolved in xylene,
200 kg. of chrome green,
200 kg. of barite,
50 kg. of titanium oxide,
50 kg. of lithopone,
150 kg. of white spirit,
10 kg. of butanol,
30 kg. of a solvent sold under the trademark "Byketol," and
10 kg. of a 50% solution of xylenole in dipentene are intimately mixed with 3 kg. of a 50% xylene solution of the neutral salt prepared according to Example 2. The addition of this suspending agent considerably retards sedimentation of the pigments.

After standing for 4 weeks, only small amounts of pigments have precipitated. The precipitate can readily be redispersed by stirring.

Of course, other salts according to the present invention can also be added to various other pigmented paints, such as house paints, machinery paints, red-lead paints, aluminum paints, colored lacquers, enamels, highway striping paints, and others. Any known and commonly used pigment as well as non-aqueous vehicle may be employed. In all these pigmented paints, the addition of between 0.1% and 1.0% of the new slightly water-soluble, but solvent-soluble salts according to the present invention considerably retards sedimentation of the pigments and permits ready redispersion of any sediment which might have formed.

I claim:

1. The salt of the acid diester of the formula

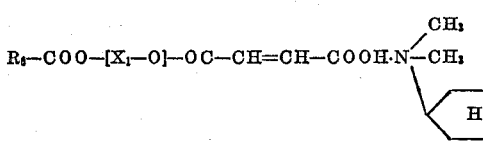

wherein $R_6$—CO—O— represents the tall oil fatty acid radicals and
$X_1$—O— represents the polyethylene glycol radical having an average molecular weight of about 200, said salt being slightly soluble in water and substantially soluble in organic lacquer solvents.

2. The salt of the acid diester of the formula

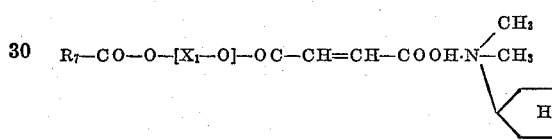

wherein $R_7$—CO—O— represents the castor oil fatty acid radicals and
$X_1$—O— represents the polyethylene glycol radical having an average molecular weight of about 200, said salt being slightly soluble in water and substantially soluble in organic lacquer solvents.

3. The salt of the acid diester of the formula

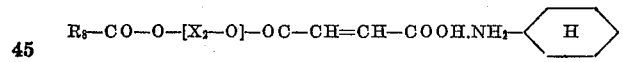

wherein $R_8$—CO—O— represents the linseed oil fatty acid radicals, while
$X_2$—O represents the polyethylene glycol radical having an average molecular weight of about 1000, said salt being slightly soluble in water and substantially soluble in organic lacquer solvents.

4. The salt of the acid diester of the formula

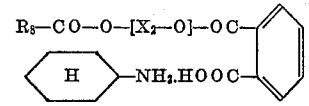

wherein $R_8$—CO—O— represents the linseed oil fatty acid radicals and
$X_2$—O represents the polyethylene glycol radical having an average molecular weight of about 1000, said salt being slightly soluble in water and substantially soluble in organic lacquer solvents.

5. The salt of the acid diester of the formula

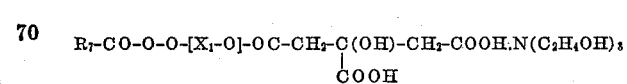

wherein $R_7$—CO—O— represents the castor oil fatty acid radicals and $X_1$—O represents the polyethylene glycol radical having an average molecular weight of about 200, said salt being slightly soluble in water and substantially soluble in organic lacquer solvents.

6. The salt of the acid diester of the formula

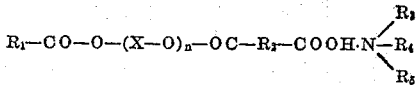

wherein

X represents an alkylene radical with 2 to 3 carbon atoms;

$R_1$ represents a member selected from the group consisting of a saturated acyclic hydrocarbon radical having 11 to 23 carbon atoms, a saturated acyclic hydrocarbon radical having 11 to 23 carbon atoms and being substituted by a hydroxyl group, an olefinic acyclic hydrocarbon radical having 11 to 23 carbon atoms; and an olefinic acyclic hydrocarbon radical having 11 to 23 carbon atoms and being substituted by a hydroxyl group;

$R_2$ represents a member selected from the group consisting of a phenylene radical, a divalent saturated acyclic hydrocarbon radical, a divalent saturated acyclic hydrocarbon radical being substituted by a hydroxyl group, a divalent saturated acyclic hydrocarbon radical being substituted by a carboxyl group, a divalent olefinic acyclic hydrocarbon radical, a divalent olefinic acyclic hydrocarbon radical being substituted by a hydroxyl group, and a divalent olefinic acyclic hydrocarbon radical being substituted by a carboxyl group, said divalent saturated and olefinic acyclic hydrocarbon radicals having 2 to 3 carbon atoms;

$R_3$ and $R_4$ represent members selected from the group consisting of hydrogen, a lower alkyl radical, a lower alkyl radical being substituted by a hydroxyl group, and a cyclohexyl radical;

$R_5$ represents a member selected from the group consisting of a lower alkyl radical, a lower alkyl radical substituted by a hydroxyl group, and a cyclohexyl radical, and $n$ is an integer ranging from 4 to 25;

said salt being slightly soluble in water and substantially soluble in organic lacquer solvents.

7. The amine salt of a diester of a polyalkylene glycol, the amine component of said salt being selected from the group consisting of tri-(lower) alkylamines, cyclohexylamine, N-lower alkyl substituted cyclohexylamines, dicyclohexylamine, and N-lower alkyl substituted dicyclohexylamines; the polyalkylene glycol component of said diester having a molecular weight between about 200 and about 1000 and being selected from the group consisting of polyethylene glycol and polypropylene glycol; one of the acid radicals of said diester being a fatty acid radical, and the other acid radical of said diester being selected from the group consisting of maleic, phthalic, and citric acid radicals.

References Cited in the file of this patent
UNITED STATES PATENTS

| | | |
|---|---|---|
| 2,295,170 | De Groote et al. | Sept. 8, 1942 |
| 2,313,799 | Bullitt et al. | Mar. 16, 1943 |
| 2,610,966 | Esposito | Sept. 16, 1952 |
| 2,710,856 | Carpenter | June 14, 1955 |
| 2,860,114 | Bolton et al. | Nov. 11, 1958 |